United States Patent [19]
Lowitz et al.

[11] Patent Number: 5,485,554
[45] Date of Patent: Jan. 16, 1996

[54] METHOD AND APPARATUS FOR PROCESSING AN IMAGE IN A VIDEO PRINTING APPARATUS

[75] Inventors: Gregory E. Lowitz, Redwood City; Albert W. Kovalick, Santa Clara, both of Calif.

[73] Assignee: Hewlett-Packard Company, Palo Alto, Calif.

[21] Appl. No.: 143,049

[22] Filed: Oct. 29, 1993

[51] Int. Cl.⁶ .................................................. G03G 15/01
[52] U.S. Cl. .......................................... 395/116; 395/117
[58] Field of Search ................................... 395/117, 116, 395/112, 109, 102; 364/519; 376/157

[56] References Cited

U.S. PATENT DOCUMENTS

| | | | |
|---|---|---|---|
| 4,835,713 | 5/1989 | Pastor | 364/519 |
| 4,965,627 | 10/1990 | Robison | 344/40 |
| 4,974,096 | 11/1990 | Wash | 358/302 |
| 5,021,820 | 6/1991 | Robison | 355/40 |
| 5,075,862 | 12/1991 | Doeberl et al. | 395/117 |
| 5,125,072 | 6/1992 | Ng | 395/112 |
| 5,168,292 | 12/1992 | Kadowaki et al. | 346/157 |
| 5,179,635 | 1/1993 | Yamazaki et al. | 395/109 |
| 5,194,892 | 3/1993 | Robison | 355/40 |
| 5,208,902 | 5/1993 | Kumon | 395/116 |
| 5,243,692 | 9/1993 | Kaneko | 395/116 |
| 5,253,081 | 10/1993 | Shoji et al. | 395/116 |
| 5,265,209 | 11/1993 | Kageyama et al. | 395/102 |
| 5,276,779 | 1/1994 | Statt | 395/109 |
| 5,276,781 | 1/1994 | Chang et al. | 395/116 |

OTHER PUBLICATIONS

"CP–11OU Color Video Printer", Mitsubishi Electronics America, Inc., Somerset, New Jersey, 1991.
"CP–21OU Large Format Color Video Printer", Mitsubishi Electronics America, Inc., Somerset, New Jersey, 1992.
"UP–5100/UP–5150 Color Video Printer", Sony Corporation (4 Pages) and labelled Feb. 1992.
"Near Photographic Quality Color Prints From A Variety of Video Sources", describing a UP–3000 color video printer available from Sony Corporation, and bearing no publication date.

*Primary Examiner*—Raymond J. Bayerl
*Assistant Examiner*—Steven P. Sax

[57] ABSTRACT

The present invention is directed to reversing the trend in conventional video printing by providing a cost-effective, flexible device which is independent of the printing device such that it can be used with any conventional computer printing device to provide plain paper prints of video images. By focusing on optimizing cost-effectiveness and system flexibility rather than providing high resolution photographic quality prints, the present invention can provide video printing features never before realized. Generally speaking, the present invention relates to a method and apparatus for processing an input video data stream by selecting at least a portion of a frame of the input video data stream as printable image data, and by processing the selected a frame to correlate the frame to said input video data stream using at least one identifier. Further, the present invention relates to a method and apparatus for processing an input video data stream by storing at least a portion of a frame of the input video data stream as printable image data, and by processing the printable image data to automatically reposition the frame on a printable medium.

19 Claims, 5 Drawing Sheets

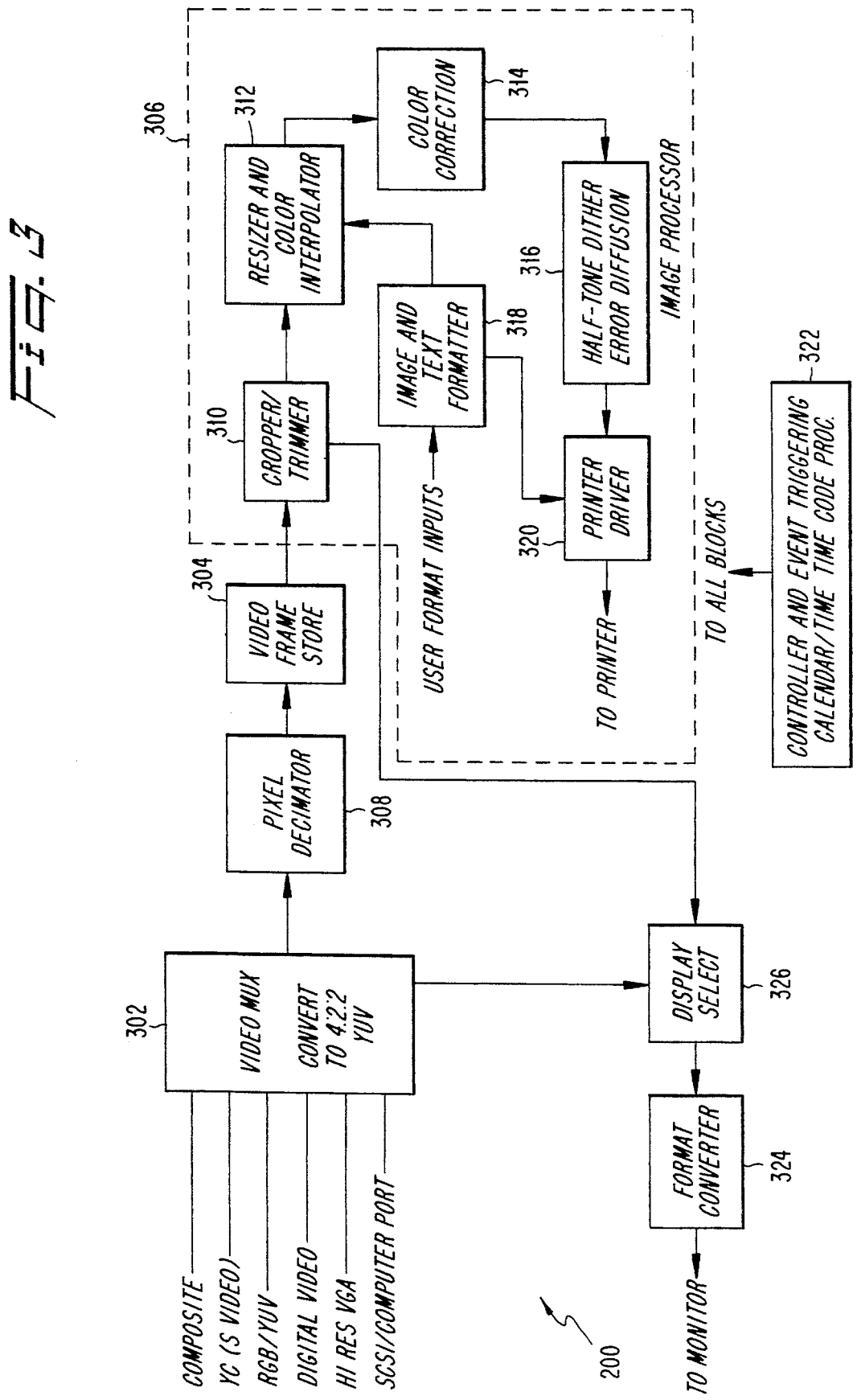

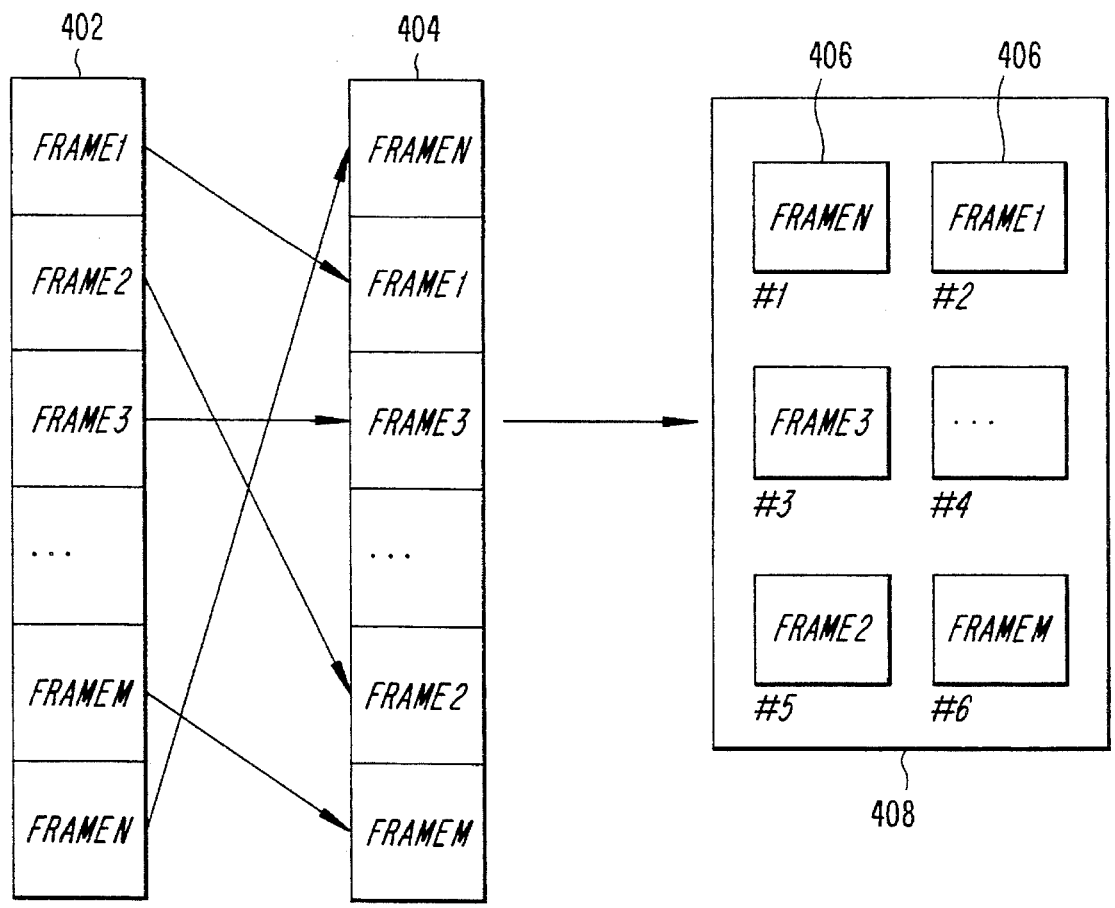

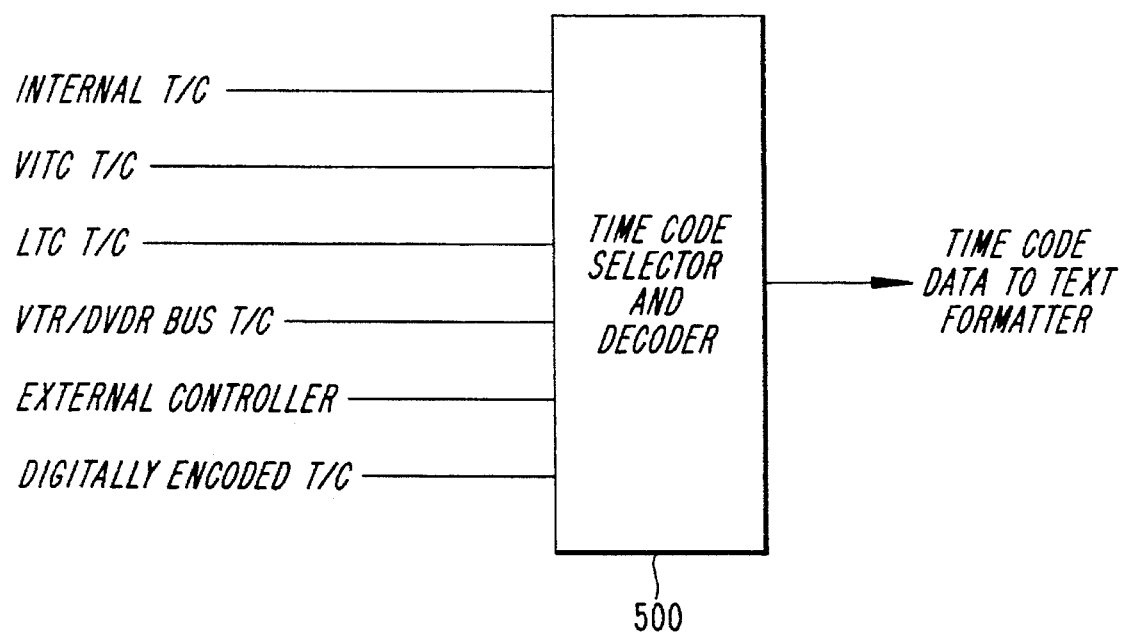

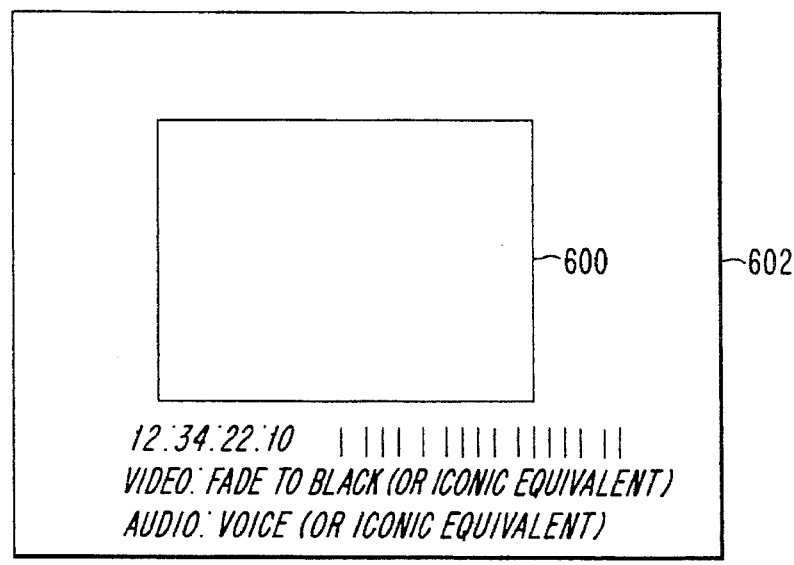
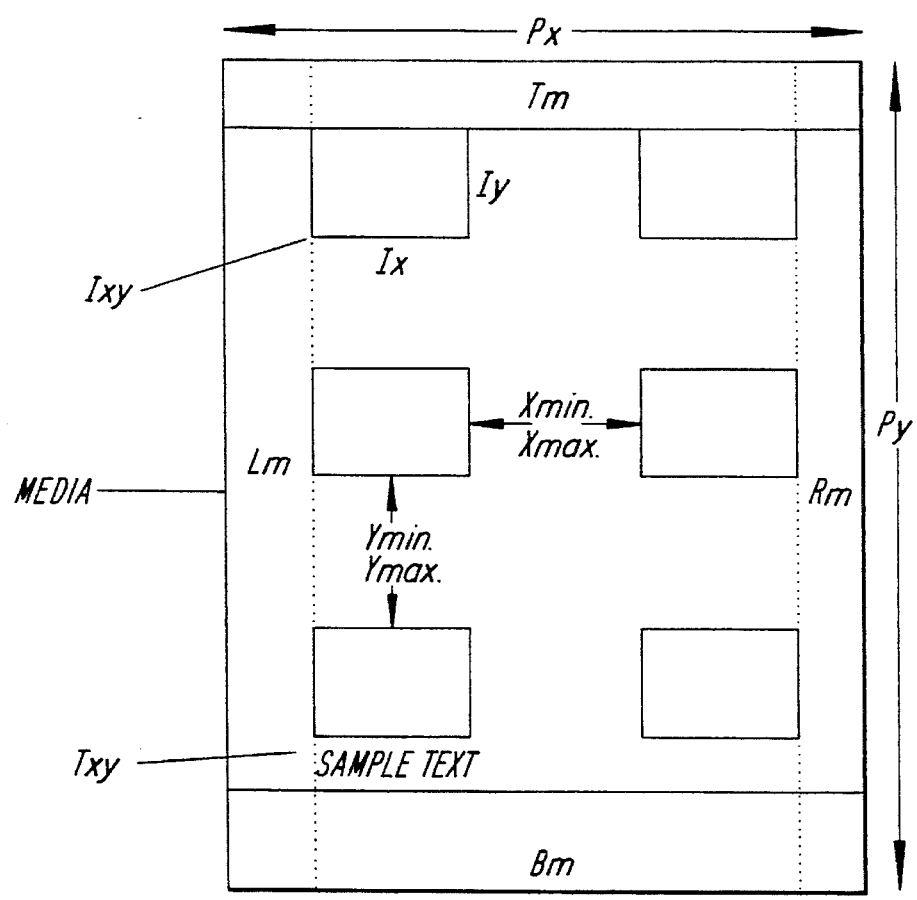

METHOD AND APPARATUS FOR PROCESSING AN IMAGE IN A VIDEO PRINTING APPARATUS

BACKGROUND OF THE INVENTION

1. Field of the Invention

The present invention relates generally to video printing, and more particularly, to printing video images on a printable medium.

2. State of the Art

Video printers for producing photographic-like images from a video input are known. These devices produce high resolution images on a medium such as thermal paper.

For example, a video printer is described in a brochure entitled, "Color Video Printer UP-5100/UP-5150" available from Sony Corp. A brochure entitled, "Near Photographic Quality Color Prints From A Variety of Video Sources" describes a Color Video Printer UP-3000 also available from Sony Corp. The video printers as described in these brochures are directed to providing high quality prints of video images on photographic-like paper. A brochure entitled, "CP-110U Color Video Printer," and a brochure entitled, "CP-210U Large Format Color Video Printer," both available from Mitsubishi, describe similar devices for producing high resolution prints of video images on photographic-like paper.

Virtually all video printers, including those described above, are integrated and dedicated devices based on dye-sublimation or thermal transfer print mechanisms. These video printers inherently define (and limit) the physical attributes of the printed media, including size of the media, size and number of images per page, and amount and legibility of textual annotations. Furthermore, conventional video printers have traditionally printed a single image per piece of media, although more recent video printers can print multiple images (same or different) on one piece of media.

Despite their apparent appeal, conventional video printers have only realized limited commercial use. This is because conventional video printers reflect the trend to focus on producing high resolution prints of near photographic quality without regard to commercial practicality. Accordingly, conventional video printers suffer significant drawbacks which are believed to have resulted in their commercial impracticality. Some of these drawbacks are as follows:

(1) the photographic-like paper required by conventional video printers (e.g., thermal paper) is awkward and difficult to handle (e.g., curling up after being printed);

(2) the photographic paper required by conventional video printers is costly, rendering the printing of more than a few photographic images prohibitively expensive; and (3) because special photographic-like paper is used by conventional video printers, they must be designed as integral units which include an expensive high resolution printing device.

In addition to being expensive to purchase and expensive to use, conventional video printers also suffer operational drawbacks which may have contributed to their impracticality. Some of these additional drawbacks are as follows:

(1) conventional video printers can not accurately capture a given video frame, rather, activation of a print button on the video printer results in a capture and print of whatever frame happens to be in a frame buffer at a given time; thus, numerous costly prints must typically be obtained before a desired frame is captured; and (2) conventional video printers lack flexibility in modifying (e.g., enhancing) the video image; a captured frame of video is merely printed in its captured form.

SUMMARY OF THE INVENTION

Accordingly, the present invention is directed to reversing the trend in conventional video printing by providing a cost-effective, flexible device which is independent of the printing device such that it can be used with any conventional computer printing device to provide plain paper prints of video images. By focusing on optimizing cost-effectiveness and system flexibility rather than providing high resolution photographic quality prints, the present invention can provide video printing features never before realized.

Exemplary embodiments of the present invention can print video images using any conventional plain paper printing device, thus avoiding the use of awkward, expensive photographic-like paper and the expense associated with purchasing a dedicated printing device for printing on photographic-like paper. By correlating a selected frame of an input video data stream to the video data stream using an identifier, a specific frame can be accurately captured and printed. The captured video frame can be processed in any of numerous ways to enhance the printed video image or video images. For example, one or more such video images can be accurately captured and automatically repositioned to optimize their presentation on a printable medium (e.g., plain paper). Exemplary embodiments revolutionize video printing, providing capabilities such as on-line editing, indexing of a video tape, automated logging of a video tape, storyboarding (i.e., providing a sequence of still images from a video input to characterize a sequence of events from the video input), video archiving and so forth.

The ability to print selected sequences or a multiplicity of video images provides an opportunity to present and organize the video imagery in ways most useful to video editors, producers, and graphic artists. Further, by encoding certain information in barcode or similar form on the printable medium, the video hardcopy output becomes a time-saving tool for non-linear editing on paper. For example, textual, numerical, and graphically encoded time code data (as part of the image layout and formatting) can be used to increase productivity throughout the entire video production process. The low-cost video image print on plain paper, with images presented in a useful manner, can significantly increase the productivity and communication ability of video professionals, leading to higher profits and improved customer satisfaction.

Generally speaking, the present invention relates to a method and apparatus for processing an input video data stream comprising steps of: selecting at least a portion of a frame of the input video data stream as printable image data; and processing said selected at least a portion of a frame to correlate said at least a portion of a frame to said input video data stream using at least one identifier. Further, the present invention relates to a method and apparatus for processing an input video data stream comprising the steps of: storing at least a portion of a frame of the input video data stream as printable image data; and processing said printable image data to automatically reposition said at least a portion of a frame on a printable medium.

BRIEF DESCRIPTION OF THE DRAWINGS

The present invention can be further understood with reference to the following description and the appended drawings, wherein like elements are provided with the same reference numerals. In the drawings:

FIG. 3 illustrates a functional block diagram of the FIG. 2 video processing apparatus;

FIG. 4 illustrates a re-ordering of a frame sequence in accordance with an exemplary embodiment of the present invention;

FIG. 5 illustrates an exemplary time code selector and decoder for use in the FIG. 2 apparatus;

FIG. 6 illustrates an exemplary video image print in accordance with an exemplary embodiment; and FIG. 7 illustrates an exemplary print format for a sheet of a printable medium in accordance with an exemplary embodiment.

DETAILED DESCRIPTION OF THE PREFERRED EMBODIMENTS

Figure 1:
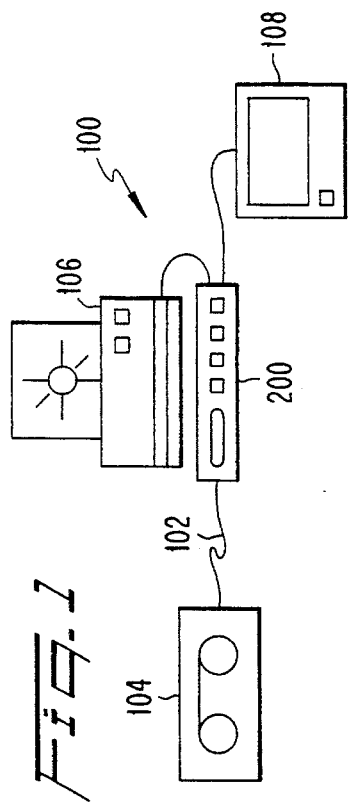
FIG. 1 shows an exemplary embodiment of a system which includes an apparatus for processing an input video data stream in accordance with the present invention.

FIG. 1 shows an exemplary embodiment of a system 100 which includes an apparatus 200 for processing a video data stream received via an input 102 from a video source 104. The video source 104 can be any video signal producing device, such as a video cassette recorder (VCR), a video tape recorder (VTR), a laser disc, a surveillance camera, a videocamera (e.g., camcorder), any television (TV) signal producing device (e.g., TV monitor), a video switcher or router, any imaging device (e.g., ultrasound imager), any computer/workstation device, any videoconferencing device, any compact disc device (e.g., compact disc read-only memory (CDROM)), and so forth. The FIG. 1 system is further illustrated as including a printing device 106 (e.g., any standard printer) and an optional video monitor 108.

Although the FIG. 1 processing apparatus 200 is shown as a stand-alone hardware element, those skilled in the art will appreciate that this is by way of example only. The processing apparatus can be configured as a software component of the FIG. 1 system, as an integrated circuit (IC) card which can plugged into a computer, a workstation or a printer, or can be configured as an integrated subsystem inside a printing device. The FIG. 1 processing apparatus 200 can be interfaced to the printing device via a parallel or serial interface. The printing device can be used to provide a hardcopy print of a video image received via the input video data stream.

Figure 2A:
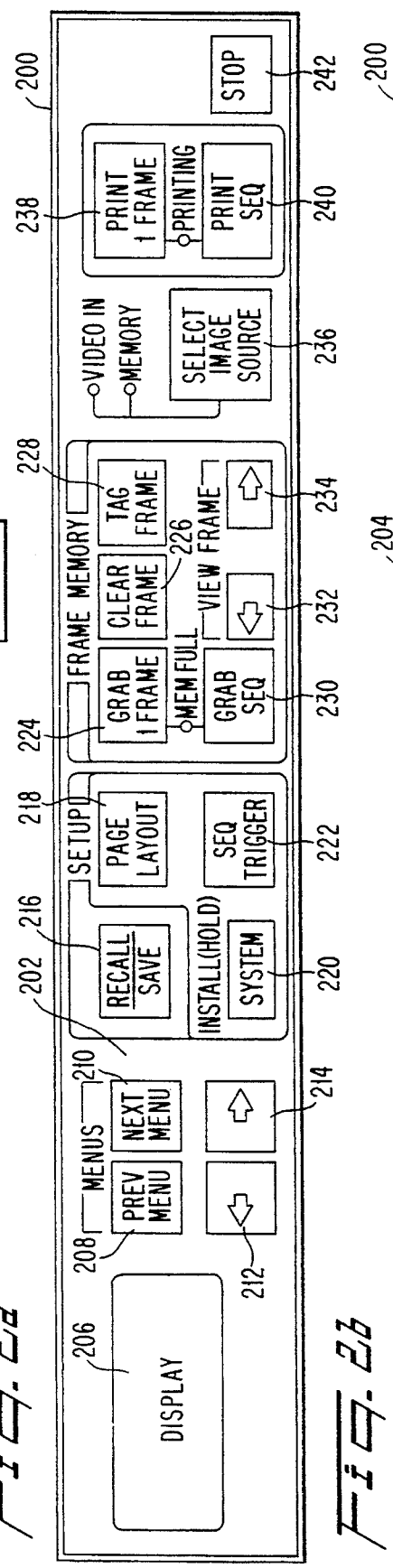
FIGS. 2a–2b show an exemplary embodiment of the video processing apparatus illustrated in FIG. 1.
Figure 2B:
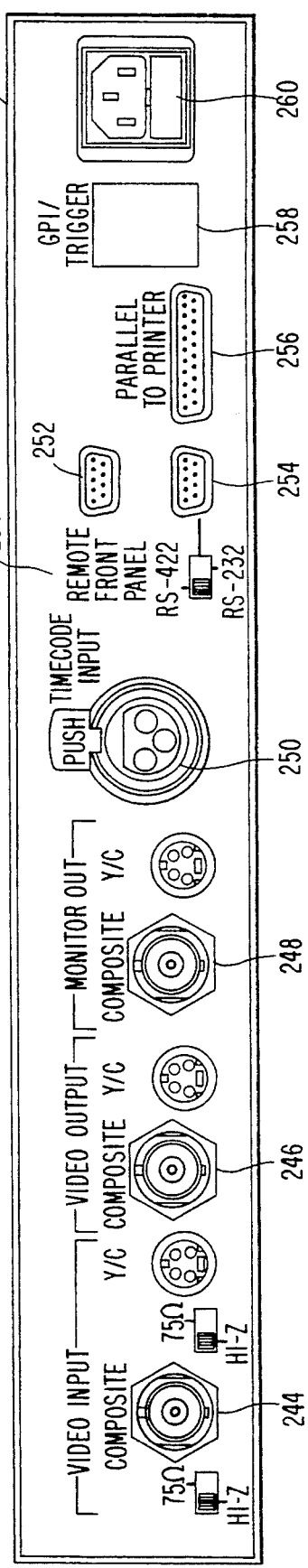

FIGS. 2a and 2b show a more detailed diagram of the front and back panels, 202 and 204, respectively of an exemplary embodiment of the video processing apparatus 200. The front panel 202 represents a user interface which includes a display (e.g., a fluorescent display) for displaying information associated with use of keys on the interface. The front panel 202 includes menu keys 208, 210, 212 and 214. The menu keys provide the user quick access to setup parameters when, for example, configuring the FIG. 2 apparatus for use with a particular video source, printer and/or monitor.

The menu key 208 and the menu key 210 allow the user to scroll vertically between menu items to examine either a previous menu item or the next menu item, respectively. These keys can also be used to scroll vertically through a particular menu list. The arrow menu keys 212 and 214 permit the user to change the setting of any given menu item once a particular menu item has been selected.

The front panel 202 also includes setup keys 216, 218, 220 and 222. A recall/save setup key 216 permits the user to recall a previous setup, such as a factory preset setup or a step previously saved by the user (e.g., a setup which includes a particular printing device). The user can scroll through plural, previously stored setups using the menu keys, and then select a desired setup from memory.

A page layout setup key 218 allows the user to control the size, position and format of one or more video images which are to be printed on a page of printable media. For example, pre-defined page formats can be stored and accessed via the page layout setup key to print video images in storyboard, edit, log, tile or single image formats. Further, customized text can be printed at any location on a printable medium along with the printed video image or images. In operation, the page layout setup key 218 can be selected, after which the menu keys 208–214 can be used to sequence through menu items such as: page format (e.g., number of video images per page of printable medium), image size, position of image, position of textual information associated with image, headers, time stamp information, time code information and page numbers. Using the arrow menu keys 212 and 214, specific characteristics under each of these headings can be selected (e.g., any one of a number of preset image sizes can be selected).

A system/install setup key 220 can be used in conjunction with the menu keys to set various system parameters. For example, upon activating the system key, the menu keys can be used to set the video source format (e.g., composite; Y/C; RGB; Betacam; Mii; YUV; Society of Motion Picture and Television Engineers (SMPTE); European Broadcasting Union (EBU); 4:2:2; 4fsc and so forth), resolution of video input, whether to capture a video image in color or monochrome, which fields should be captured (e.g., A and B, A only, B only), whether to printout in color or monochrome, time code source (e.g., internal, vertical interval time code (VITC), longitudinal time code (LTC), remote, none), set parameters for: hue; saturation; contrast; brightness (e.g., each of which can be variable, and set by incremental step adjustments using the menu keys 212 and 214), and number of copies of the video image.

When the system/install setup key 220 is held down into its install state, the menu keys can be used to select parameters which remain constant within a given setup, such as time and date, printer model and language. For example, in operation the menu keys can be used to scroll through menu items such as printer type, units (e.g., English or metric), paper size of printable medium (e.g., letter, legal and so forth), paper type (e.g., plain, glossy, transparency and so forth), header language (e.g., English, German, Japanese and so forth), baud rate (e.g., any baud rate within a given range, such as a range up to 38400 bits per second or greater), parity (e.g., none, odd, even, zero, one, ignored), data bits (e.g., 8 data bits), stop bits (e.g., one, two and so forth), pace (e.g., whether acknowledgements will be required), time, month, day and year.

A sequence trigger setup key 222 can be used in conjunction with the menu key to select from among a wide range of flexible triggering modes (i.e., variety of trigger output signals for initiating or terminating storage of a video image). For example, a general purpose interrupt (GPI) trigger accessible via the back panel 204 (FIG. 2b) can be selected to provide a trigger output signal. Other exemplary menu items can include a manual trigger, a trigger based on a time interrupt, a detected scene change in input video data stream, a combination of a time interrupt and a scene change, and so forth. Alternately, the sequence trigger setup key 222 can be used to select a trigger at time intervals which are set via the menu keys (e.g., trigger every predetermined period of time such as from 1 to 60 seconds). The sequence trigger setup key can be used to initiate an action such as grabbing of a frame, grabbing of a sequence of frames, printing of a frame, printing of a sequence or stopping the printing of a frame.

The front panel 202 of FIG. 2a also includes a plurality of operational keys 224, 226, 228, 230, 232 and 234. The grab one frame operational key 224 permits the user to grab, or capture a single video image. Afterward, the image can be viewed, resized and printed as often as desired on any available size of paper. In operation, the grab one frame operational key controls the capture of a single frame from a video data stream input and adds this frame to the end of a video frame store (i.e., frame memory such as a first-in first-out (FIFO) video random access memory (VRAM).

The grab sequence operational key 230 permits the user to grab a sequence of frames according to a sequence trigger setting previously established using the sequence trigger setup key 222. For example, if the sequence trigger setup key is set to a minimum, consecutive frames can be grabbed upon activation of the grab sequence operational key. If a circular frame memory is used, the frame memory is overridden in a first-in first-out manner.

A clear frame operational key 226 can be used to delete a frame from the frame memory. Alternately, this operational key, if depressed for a predetermined period of time (e.g., ½ second), can be used to clear the entire frame memory. For example, when the FIG. 2 apparatus is in a video data stream input mode, pressing of the clear frame operational key 226 can be used to clear the most recent frame of video data grabbed.

A tag frame operational key 228 can be used to establish a print order so that frames can be printed from the frame memory in any order selected by the user. For example, pressing of the tag frame operational key can be used to mark specific video images to be printed during a print sequence operation. Activating the tag frame operational key for a predetermined period of time (e.g., ½ second) can be used to erase all frames that had been tagged.

Frame review operational keys 232 and 234 can be used to browse through frames previously stored in the frame memory so that the user can print the video images desired. For example, pressing of these frame review operational keys, each of which is designated by an arrow, allows the user to scroll forward or backward through the frame memory. As each frame is viewed, it can be tagged using the tag frame operational key 228.

In addition to the operational keys, the front panel 202 includes specialized function keys. One of these specialized function keys is labeled as a select image source function key 236. This key can be used to print video images from a live video input or from the frame memory. By activating the select image source function key, the source of the video image to be printed can be toggled between the video input and the frame memory. Further, a display monitor, such as the monitor 108 of FIG. 1, can be toggled according to the selected image source to display the image source selected.

A print one frame function key 238 and a print sequence function key 240 can be used to print single frames or complete sequences of video images. For example, the print one frame function key can be used to print a single frame on a printable medium either from a frame memory or from a live video input, depending on the setting of the select image source function key. The print sequence function key can be used to print a sequence of frames on one or more sheets of printable medium according to a setting of the image format (i.e., page layout) and trigger mode (i.e., sequence trigger) setup keys. Again, a sequence of video images can be printed either from a live video data stream input or from a frame memory.

A stop function key 242 is also provided. This function key can be used to cancel a print. Further, this key can be used to return the user to a machine ready state when the user has previously activated a menu operation. When the stop function key is activated, any changes previously made in using any of the menu, setup or operational keys can be saved. When in an operating mode, the stop function key can be used to exit a working process, such as a grab sequence operation or a printing operation.

Having described an exemplary embodiment of a processing apparatus front panel, a discussion will now be provided of the back panel 204 illustrated in FIG. 2b. The back panel 204 includes a video input section which can be adapted to receive any video data stream input format. For example, the exemplary embodiment of FIG. 2b includes a composite video data stream input 244. The video input 244 of FIG. 2b is illustrated as a composite and Y/C video input. For example, a composite/S-video can be input via this video input. The back panel also includes a composite and Y/C video output 246, and a composite and Y/C monitor output 248. The composite and Y/C monitor outputs allow the user to view video images on relatively inexpensive preview monitors, such as the video monitor 108 of FIG. 1. Although reference has been made to composite and Y/C video inputs and outputs, those skilled in the art will appreciate that the FIG. 2 apparatus can be readily reconfigured to accommodate any video format, such as component/RGB, or serial digital 4:2:2 video formats. Further, all video inputs and outputs can be readily adapted to accommodate 525/625 NTSC and PAL video signals.

A time code input 250 is provided on the back panel 204 of FIG. 2b. The time code can be used to derive a trigger output signal. Further, the time code input permits the user to selectively print a time code with video images. Such a time code, when printed with a video image, can be used for video indexing and archiving.

The back panel 204 also includes a remote front panel interface 252 to provide full access to all front panel features over a dedicated RS-422 bus. Such a feature permits ready interfacing of an edit room in a video production house to a machine control room. An RS-422/RS-232 remote control port 254 can be used to provide remote programming of all front panel parameters. Such a feature can be used to integrate the FIG. 2 apparatus to third-party controllers. A parallel output printer interface 256 can be used to interface the FIG. 2b apparatus to any conventional printer or plotter (e.g., any portable printer such as those available from Hewlett-Packard Co.).

A general purpose interrupt input 258 can be used to provide remote triggering from any source (e.g., an edit controller, a contact closure or a transistor-transistor logic (TTL) line driver). The general purpose interrupt input can, in accordance with exemplary embodiments, be optically coupled, and can be used to receive parallel inputs from multiple sources.

The back panel 204 also includes a power supply input 260 to provide a power source through all internal components.

Having discussed an exemplary embodiment of a processing apparatus 200 with respect to a user interface and input/output (I/O) features, reference will now be made to FIG. 3 to disclose exemplary internal operations thereof. FIG. 3 illustrates an exemplary functional block diagram of a processing apparatus 200. As illustrated in FIG. 3, a video input data stream of any available video source (e.g., composite, Y/C (S-G), RGB/YUV, digital video (e.g., 4:2:2), high resolution VGA, SCSI/computer port and so forth) are input to a video multiplexer 302.

The FIG. 3 apparatus processes an input video data stream received via the video multiplexer 302. In accordance with exemplary embodiments, the FIG. 3 apparatus includes a buffer, such as a video frame store 304, for storing at least a portion of one frame of the input video data stream as printable image data. The video frame store 304 can, for example, be an expandable video random access memory (VRAM) simms, which can be installed in, for example, 2 Megabyte increments.

The video multiplexer 302 can include a converter for converting at least a portion of a frame from a first video data format in which the video data stream is received to a second video data format (e.g., convert a composite format to a YUV format). Such conversion techniques are well known and need not be described in detail.

A data compressor 308 can be provided for selectively reducing an amount of stored video data used to represent a frame of the input video data stream in the video frame store 304. The data compressor can implement any conventional video compression algorithm. Further, the data compressor can include any known pixel decimator (e.g., a Philips 7194 decoder resizer control) for reducing the number of pixels used to represent a video image by, for example, selectively eliminating pixels (e.g., by selecting one of four pixels to represent the four pixels, eliminating the other three to thereby reduce the number of pixels from four to one for each four pixel location).

The processing apparatus 200 further includes a processor 306 for processing at least a portion of a frame stored in the video frame store to correlate at least a portion of the frame to the input video data stream using at least one identifier. In accordance with an exemplary embodiment, the processor can include a means for selectively trimming at least a portion of the frame stored in the video frame store 304. For example, the selective trimming means can be a conventional cropper/trimmer 310 which is used to remove edge pixels of a video image. In an exemplary embodiment, the user can crop a video image to maintain a predetermined aspect ratio with each incremental crop.

Further, the processor 306 can include means for scaling a printable video image associated with printable image data of at least a portion of a frame. In an exemplary embodiment, the scaling means can be any conventional resizer and color interpolator 312.

The exemplary FIG. 3 processor 306 also includes a means for correcting color of the printable image, represented by a color correction 314. The color correction 314 can be any conventional color corrector for providing a corrected video image which satisfies desired color conditions. The processor 306 can also include an image corrector 316. In an exemplary embodiment, the image corrector 316 can be used to achieve improved printing resolution (e.g., using established methods of half-tone, dither and error diffusion).

The processor 306 includes means for formatting a video image and textual or iconic information for printing on a printable medium. In an exemplary embodiment, a formatting means is represented as an image and text formatter 318 which is responsive to a user format input selected via the FIG. 2a front panel of the processing apparatus 200. Outputs of the image and text formatter 318 can be supplied to any conventional printer driver 320 used to drive any conventional printer.

Control inputs to all functional blocks of the processor 306 are illustrated by the input block 322. The input block 322 can provide such inputs as controller and event triggering, calendar/time inputs and time code processing inputs.

A video image from any of the functional blocks in FIG. 3 can be displayed for review. For example, a cropped video image obtained from the cropper 310 can be provided to a display format converter 324 to drive any conventional monitor. A display select 326 can be used to drive the format converter from the cropper/trimmer 310 or from the video input so that the user can selectively view the input video data stream or the cropped video image received from the video frame store 304.

Having discussed exemplary embodiments of a system and processing apparatus in accordance with the present invention, specific features of exemplary embodiments of the present invention will now be described with respect to FIGS. 4–6. In accordance with the present invention, an input video data stream can be processed by selecting at least a portion of a frame of the input video data stream as printable image data, and by processing the selected portion to correlate this portion of a frame to the input video data stream using at least one identifier. In accordance with exemplary embodiments, this identifier can be a "tag" or "mark" associated with a specific frame of the input video data stream in memory. Thus, at least a portion of the frame can be stored in memory with at least one identifier as printable image data so that the two can be printed together if desired.

The identifier can be used to establish an ordered list for sequential printing when multiple images have been stored into the video frame store 304 so that the frames can be reprinted in any desired order. The identifier permits the processing apparatus to keep track of the order in which each video image to be printed was tagged, independent of the order in which the images were captured. Thus, for example, if three successive frames of video image data were stored in memory in the order 1, 2, 3, the user can selectively print these video images in the order 3, 1, 2 by tagging them in the re-sequenced order. In accordance with an exemplary embodiment, the order in which video images are printed can be displayed by labeling each video image with textual information such as: FRAME=23 (tag 16); 40 Grabbed, 24 Free. This textual information can be used to indicate that the 23rd frame stored in the video frame store has been tagged and will be the 16th image printed on a page. The second portion of this textual information indicates that 40 frames have been stored in the video frame store, and that 24 spaces remain available.

In operation, a user selectively stores a sequence of one or more frames in the video frame store using the grab frame or grab sequence operational keys 224 and 230 (FIG. 2a). Each activation of the grab frame operational key adds one frame at a time to the video frame store. A grab sequence operational key automatically grabs a sequence of images according to a predefined trigger, (every given period of time). Thus, a series of frames can be grabbed in rapid succession to analyze a critical event.

In operation, a trigger output signal produced in response to a predetermined trigger condition indicates to the processing apparatus when to act, thereby controlling (e.g., initiating or terminating) a particular function (e.g., storage, or capture, of at least a portion of a video frame). As referenced herein, the phrase "controlling storage" refers to any manner by which at least a portion of data included in the input video data stream can be saved, either in a memory (such as the frame store) or directly on a printable medium. The trigger output signal can control (e.g., initiate or terminate) a frame store capture of a specified number of frames.

Each grabbed frame of the input video data stream can be placed into the video frame store in sequential order with a pointer starting at frame one (where the video frame store was initially empty), or frame N+1, where frame N was the last frame stored in the video frame store. To print the sequence of frames without reordering or preselecting a subset of images, the print sequence functional key 240 can be activated. Each video image is printed in accordance with the format established using the user-selected page layout setup key 218 (FIG. 2a).

To print all or a subset of the stored video images, the tag frame operational key 228 can be activated as the video images stored in the frame store are sequentially reviewed to select (or unselect) those video images which the user wishes to print. The original order of frames as sequentially stored in the video frame store is preserved. However, using the tag frame operational key 228, a new sequence list can be generated to tag a new order in which a user wishes to print a selected sequence of video images.

For example, referring to FIG. 4, the left-hand portion of the figure illustrates a sequential order 402 in which video frames one through N were captured and concatenated into the video frame store (i.e., frames F1 . . . $F_m$, $F_n$). The number of frames stored is limited only by the resolution in which the video images were stored and by the amount of desired frame store memory chosen when implementing the processing apparatus 200.

Tags can be attributed to frames by scrolling through the frame store memory, viewing each video image as it is accessed on a monitor. Scrolling of the video frame memory can be performed using the frame review operational keys 232 and 234 (FIG. 2a). The user presses the tag frame operational key as each frame to be printed is viewed to establish a sequence in which a set of frames will be stored for printing. When one or more video images are stored in the video frame store and each image has been tagged, tagged video images will be printed during a print sequence operation. Thus, the user can reorder stored video images for printing, and/or print only a subset of video images stored in the video frame store.

To clear the tagged frames, a clear tag operational key can be activated (e.g., the tag key can be pressed twice) with respect to a selected video image to toggle from a tagged frame condition to a tag off frame condition. A reordered tag sequence of frames as stored in an image sequence or memory portion of the video frame store 304 is illustrated by the column 404 in FIG. 4. The right hand portion of FIG. 4 illustrates a print sequence of the reordered video images 406 selected using the tag function on a single sheet of printable medium 408 (e.g., plain paper).

In accordance with another feature of the present invention, the processing apparatus 200 can print at least one frame and one identifier as illustrated in the right hand portion of FIG. 4. The processing apparatus 200 can store at least portions of plural frames of the input video data stream in sequential order of receipt, and can store at least one identifier to establish the reordered print sequence for the plural frames. Again, the identifiers represented by the tag sequence can be stored in response to a control input such as user activation of the tag frame operational key 228 (FIG. 2a). The plural frames can then be printed in their reordered print sequence as illustrated in FIG. 4.

In accordance with another feature of the present invention, the identifier can be an index which is stored as printable image data, the index identifying a sequential location of at least a portion of a frame within the input video data stream. For example, a time code such as an Society of Motion Pictures and Television Engineers or European Broadcasting Union time code can be associated with each stored video image in the form of: hh:mm:ss:ff, where h=hours, m=minutes, s=seconds and f=frames. The time code associated with each video image can be printed on or near each video image to provide a location reference back to the master source (e.g., a video tape or disk) from which the input video data stream was received. As will be described further with respect to formatting features of the present invention, a text positioning variable $T_{xy}$ can be used to determine the relative x-y position of the time code information on the printable medium (e.g., next to the video image). The time code can be used for recording, archiving, indexing, editing and retrieving video.

In situations where an imbedded time code is unavailable, an internal time code can be synthesized starting at: 00:00:00:01. For example, this starting time code can be associated with the first frame stored on a video disk to track the location of each frame on the video disk as the video disk is played and the input video data stream is received by the processing apparatus 200. Alternately, time code information can be derived from any one or combination of numerous sources such as: an internal time code generated by an internal clock or frame counter of the processing apparatus, a vertical interval time code (VITC) which is read from the vertical interval of an incoming video signal, a longitudinal time code (LTC) which is read from an external audio-frequency time code input, a remote time code read over an electronic bus (e.g., an RS-422 bus from a video tape recorder or a digital video disk recorder (DVDR), a time code read over an electronic bus from a computer controller or the like, or a time code digitally encoded onto a digital video signal such as a serial digital signal conforming to SMPTE 259M. The exact time code which is used as a trigger for capturing a video image in the frame memory store can be selected automatically using a default to an available time code of the processing apparatus 200 or can be set manually. For example, a user input received via the input block 322 of FIG. 3 can be used to activate a time code selector and decoder included therein.

A time code selector and decoder 500 is illustrated in FIG. 5 with respect to the exemplary time code information discussed previously. Outputs of the time code selector and decoder illustrated in FIG. 5 can be input as time code data to the image and text formatter 318 of FIG. 3 so that time code information can be printed in a location proximate to each video image as illustrated in FIG. 6.

In addition to outputting time code data to the image and text formatter 318 of FIG. 3, a code can be used to indicate to the user the type of trigger (e.g., time code) associated with the video image. For example, the following coding can be used for various time codes: "I" for internal time code, "V" for VITC time code, "L" for LTC time code, "B" for bus time code from video tape recorder or digital video disk recorder remote control bus, "R" for time code from remote external controller bus, and "D" for digitally encoded time code. By using the set up keys, the user can, for example, specify that time code information be printed immediately to the lower left corner of a video image printed on a printable medium (see FIG. 6).

In accordance with yet another feature of the present invention, information such as the index used to identify a sequential location (e.g. time code) of at least a portion of a frame within the input video data stream can be printed on the printable medium using a bar code representation. The bar code information can be printed with or without the numerical information described previously, as illustrated in FIG. 6.

The use of bar codes, or other electronic coding, ensures random access, error-free entry of a time code read from the printable medium. That is, during a subsequent video editing process, the printable medium which includes a video image and the associated bar code time code information can be used as follows. The user can scan the bar code on the printable medium with a bar code reader. Control signals received by the bar code reader can then be used to automatically activate a video storage device (e.g., video tape recorder) to advance to the frame associated with the printed video image. Thus, quick, easy and accurate access to a particular portion of an input video data stream can be achieved. In this sense, the printed video images can be used to video index the input video data stream and to quickly advance to any desired frame. Additional bar codes can be printed to provide any desired control feature for the storage device (e.g., fast forward, reverse, stop and go forth) to thereby provide a complete array of video editing control functions.

In accordance with an exemplary embodiment, information such as the time code can be encoded into a bar code format using any conventional industry-standard methodology for bar coding. The bar code can then be placed anywhere on the printable medium using the text positioning variable $T_{xy}$. Thus, the user can establish a print format for the printable image data which includes the frame of the input video data stream and the index and/or bar code, then print the printable image data on a printable medium in accordance with this print format. As illustrated in FIG. 6, a video image is represented as a block, with a time code and bar encoded time code being immediately located adjacent to the video image 600 on printable medium 602.

In accordance with yet another feature of the present invention, an identifier can be stored as an indicator of a video effect associated with at least a portion of a frame. For example, the indicator can be a textual or iconic reference which can be printed with at least a portion of a frame to reference the type of video effect which immediately precedes or succeeds the video image. For example, the textual or iconic reference can be used to indicate that the video image is included in a "fade to white" a "fade from white", a "fade to black", a "fade from black", a "cut" (scene change), a "dissolve scene", a "pan", a "zoom", an "overlay", a "wipe", a "special effect", and so forth. Again, the variable $T_{xy}$ clan be used to position the transition effect (i.e., either textual or iconic) on the printable medium. Again, FIG. 6 illustrates a textual reference to a video effect associated with a video image to represent that the video image is included within a fade to black sequence of the input video data stream.

In a manner similar to the use of a video effect identifier for correlating a video image to an input video data stream, an audio effect textual or iconic reference can be associated with the video image as well. For example, the indicator of an audio effect associated with at least a portion of a frame can be used to indicate that the audio associated with a video image is music, voice, silence, noise, a particular sound effect and so forth. Again, the variable $T_{xy}$ can be used to position the indicator of the audio effect (i.e., either textural or iconic) on the printable medium in a manner illustrated in FIG. 6, wherein an audio effect is indicated for the video image (i.e., a voice audio is associated with the video image printed).

In addition to the association of identifiers with selected video images which are printed in any sequential order, a processing apparatus in accordance with the present invention affords the user an ability to automatically position at least a portion of a frame and at least one identifier on the printable medium in a variety of page formats with text and headers. For example, page formats for storyboarding, graphics/still store logging and video indexing represent useful examples. Headers can include automatic time and date stamping, automatic page numbering, automatic numbering of images in a sequence and space for textual annotations anywhere on the printable medium.

FIG. 7 illustrates an example of a sheet of printable medium which can be formatted in accordance with exemplary embodiments of the present invention to accommodate one or more video images. The exact formatting for a particular sheet of printable medium can be set by the user via the page layout setup key 218 (FIG. 2b).

As illustrated in FIG. 7, various dimensions can be set by the user such as an x-axis horizontal dimension of the printable media ($P_x$), a y-axis vertical dimension of the printable media ($P_y$), a left margin ($L_m$), a right margin ($R_m$), a top margin ($T_m$), a bottom margin ($B_m$), the positioning variable $T_{xy}$ for establishing an x-y position of an arbitrary icon or line of text of specified font (F) and point size (P) with $T_{xy}$ being justified right, center or left with respect to the bottom of text, and x-y position of an image of arbitrary size as referenced, for example, to any corner of the image, the center or any location specified by the user ($I_{xy}$), a dimension of an image in the horizontal x-axis ($I_x$), and a dimension of an image in the vertical y-axis ($I_y$). Further, the user can specify minimum and maximum allowable spaces between plural images to be printed on a printable medium. For example, the user can specify a minimum allowable space between images in the horizontal x-direction ($X_{min}$), a maximum allowable space between images in the horizontal x-direction ($X_{max}$), a minimum allowable space between images in the vertical y-direction ($Y_{min}$), and a maximum allowable space between images in the vertical y-direction ($Y_{max}$). In addition, the user can specify a maximum printable area on the printable medium as defined by variables $L_m$, $R_m$, $T_m$ and $B_m$, and so forth.

For most video images, the user can specify that $3x*I_x = 4*I_y$ to preserve a 4×3 aspect ratio However, as described previously, the cropping/trimming feature can be used to change the aspect ratio of an image if desired. Those skilled in the art will appreciate that any format can be accommodated in accordance with the present invention and specified by the user during a setup operation, the foregoing discussion being by way of example only. Page layouts can be optimized to accommodate one or more video images independent of aspect ratio.

Thus, in accordance with exemplary embodiments of the present invention, a user can specify either from a remote control interface or from the front panel shown in FIG. 2b, the exact x-y position of text, numeric data, graphics (e.g., logos), icons and video images on a printable medium. Further, a user can synthesize a video print of a large image by subdividing it into smaller video images which individually fit on a readily-available printable media. Each of the video images as printed can be concatenated in an x-y tile manner to simulate a larger image. In subdividing a larger image into smaller images, the processing apparatus can examine the dimensions $P_x$ and $P_y$ of the printable media relative to the desired image size (i.e., $I_x$ and $I_y$). If either $I_x$ or $I_y$ is larger than $P_x$ or $P_y$, respectively, the processing apparatus can partition the video image into separate video images for printing on separate sheets of printable media by optimizing video image size (i.e., in a manner similar to that used to optimize a desired number of images per page). The minimum number of sheets of the printable media can be used to print the image in the size specified by the user.

By detecting that a user specified size of a video image will not fit on an available printable medium in an orientation specified by the user, the processing apparatus can also automatically reorient the video image to force a landscape orientation versus a portrait orientation of the video image (i.e., rotate the video image 90° to fit on a printable medium). To implement the automatic selection of a landscape versus a portrait mode, assume the user is printing on a sheet of printable medium which is 8.5 inches wide by 11 inches high. If the user selects an automatic orientation mode of operation, the orientation of the printable medium will be adjusted automatically to best fit an image or sequence of images on the page. For example, if the user selects a single 4 inch×3 inch image, the processing apparatus will default to a portrait mode. However, if the user selects a video image wherein the x-axis exceeds the margins established by the input parameters $L_m$, $R_m$, $T_m$ and $B_m$, then the image on the sheet of printable medium can be rotated automatically to a landscape mode to achieve a comfortable fit of the image thereon. If no margins are violated, the video image can be printed without error.

Exemplary embodiments of the present invention can also provide an aesthetically balanced image positioning and layout of video images on a printable medium based on a user-specified video image size. For example, where the user selects a video image size which does not exceed the size of a currently selected printable medium, the processing apparatus can determine the number of such video images which will fit on the printable medium and place the video images in a manner which conforms with constraints set by the user during the setup operation. For example, a user can select a desired image size (e.g., 4"×3"), and instruct the video processing apparatus to optimize and arrange the number of video images per page based on this user specified image size. The processing apparatus will iterate to determine how many images can be fit onto a single sheet of the printable medium in either a portrait mode or a landscape mode without violating conditions set by the margins and spacing variables preset by the user. Allowances for text and icons included in the printable image data must be taken into consideration in this calculation.

In accordance with yet another feature of the present invention, plural frames of the input video data stream can be stored as printable image data and, based on a user-specified number of images per page, a print size for each of the video images can be automatically selected. For example, the user can specify that six video images are to be printed on each sheet of printable media. The processing apparatus will optimize image size to ensure an appropriate layout.

For example, assume that the user has specified that 9 video images are to be printed on a sheet of printable media using automatic size selection and no text or iconic information. Further assume that the sheet of printable media has dimensions of $P_x=8.5$ inches and $P_y=11$ inches, and that the user has specified margins of $L_m=R_m=T_m=B_m=1$ inch, such that a net printable area on the medium is 6.5 inches×9 inches. Further, assume that the user has specified $X_{min}=0.25$ inches and that $X_{max}=0.50$ inches; $Y_{min}=0.25$ inches and $Y_{max}=3$ inches. To optimize the image size, the processing apparatus begins by assuming that one video image can be printed on each row, with the largest possible image being 6.5 inches across. For a 4×3 aspect ratio, the Y dimension of the image would be ¾*6.5 inches=4.88 inches.

The processing apparatus then determines that 9 images with minimum spacing of $Y_{min}=0.25$ inches cannot fit on the printable medium since 9*4.88 inches+8*0.25 inches=45.88 inches, thus exceeding the available Y printing dimension of 9 inches. The processing apparatus then iteratively attempts to place two images per row. To place two images per row requires at least one vertical margin of not less than 0.25 inches between the video images in a given row, such that the next printable dimension is reduced from 6.5 inches to 6.25 inches. Dividing 6.25 inches by 2 results in a horizontal X-direction image size of 3.13 inches, and results in a Y dimension of ¾*3.13 inches=2.34 inches. The processing apparatus then determines whether 9 such images will fit with a minimum spacing of $Y_{min}=0.25$ inches. To determine whether at least 9 images will fit on the sheet of printable medium with 2 video images across each row requires 5 rows of images, and 5*2.34 inches+4*0.25 inches=12.72 inches, thus exceeding the available Y-printable dimension.

Accordingly, the processing apparatus again iterates yet another attempt by incrementing the number of images across each row to 3 (i.e., 3 images in each row), thus requiring a total of 2 margins within each row (i.e., one between each of the 3 images). The net printable dimension is therefore 6.5−2*0.25 inches=6 inches. Dividing by 3 images per row, each image is now 2 inches× 1.5 inches (i.e., the Y dimension is ¾*2 inches= 1.5 inches). The processing apparatus then determines whether 3 images per row can fit in the Y direction to achieve the 9 images per page. With 3 images per row, and 3 rows, the processing apparatus determines that 3*1.5 inches+2*0.25 inches=5 inches. Because 5 inches is less than 9 inches (i.e., the printable Y dimension), the processing apparatus determines that this spacing will satisfy the user specified constraints.

The printing apparatus then varies the parameter $Y_{min}$ to achieve optimal vertical spacing. With 9 inches available and 3 rows of images, the processing apparatus determines that 9−3*1.5 inches=4.5 inches. Dividing by the number of spaces between the 3 rows of images (i.e., 2) results in 2.25 inches. Accordingly, the processing apparatus determines that 9 images can be placed on a single sheet of the printable medium, with an adjusted delta X between images of 0.25 inches and an adjusted delta Y between images of 2.25 inches. This same procedure can be followed for any number of images, as will be readily apparent to those skilled in the art.

In accordance with other features of the present invention, those skilled in the art will recognize that any video signal processing can be incorporated into the processing apparatus to enhance the resultant video image printed. For example, as was described previously, cropping, panning, enlarging or shrinking of an image can be used to print or highlight only areas of particular interest.

Further, any of numerous forms can be printed with a printing device, such as audio logging sheets, tape logs, storyboard forms, client invoices regarding number of prints consumed, bar code images representing video transition effects such as fades, wipes, page turns and the like, and so forth. For example, a status sheet can be printed with optional symbolic icons to illustrate the status and conditions of all programmable variables governing system set up and image layout. The processing apparatus can be used to output information on a printable medium to indicate all menu selected information such as page layout information, system configuration, trigger selection, status of tasks (e.g., recall/save and settings information), effects information (e.g., monochromatic input/output, mirror imaging, inverted imaging and so forth), and labeling information (e.g., job title, client name, video source, time stamp information, time code information, font and so forth).

Further, any conventional techniques of pixel decimation and compression/decompression can be used in accordance with the present invention. Further, any known techniques for establishing trigger events can be used to initiate a frame capture. For example, any conventional techniques for identifying scene changes (e.g., by examining consecutive frames to determine whether at least a predetermined number of pixels have undergone a color on intensity change that exceeds a predetermined threshold) can be used.

Those skilled in the art will appreciate that the exemplary embodiments described above are illustrative. For example, the processing apparatus 200 can be included in any of the system devices illustrated in FIG. 1. Indeed, those skilled in the art will appreciate that all of the FIG. 1 components can be combined into a single stand-alone unit if desired.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Method for processing an input video data stream comprising steps of:

selecting and storing at least portions of plural frames of the input video data stream in a memory as printable image data;

processing said selected at least portions of the plural frames to correlate said at least portions of the frames to said input video data stream using at least one identifier, wherein said identifier includes an index which correlates at least one of said selected portions of said frames to a sequential location within said incoming video data stream and an image sequence identifier which identifies a reordered print sequence within which said stored portions of said video frames are to be printed, said identifier being stored with said at least one of said selected portions of the frames for retrieving said at least one of said portions of said frames from said memory; and printing said at least one of said selected plural frames in said reordered print sequence in accordance with a print format.

2. Method according to claim 1, further comprising a step of:

controlling storage of said at least one identifier as printable image data.

3. Method according to claim 2, further comprising a step of:

printing said at least one of said selected portions of the frames and said identifier.

4. Method according to claim 3, wherein said step of storing at least one identifier further includes a step of:

storing said at least one identifier in response to a control input.

5. Method according to claim 1, further comprising a step of:

storing said index as a bar code representation.

6. Method according to claim 1, wherein said step of processing further includes a step of:

storing an indicator of a video effect associated with said at least one of said selected portions of the frames.

7. Method according to claim 6, further comprising a step of:

controlling storage of said indicator as a textual or iconic reference; and printing said at least one of said selected portions of the frames and said textual or iconic reference.

8. Method according to claim 6, further comprising a step of:

controlling storage of an indicator of an audio effect associated with said at least one of said selected portions of the frames.

9. Method according to claim 1, wherein said step of processing further comprises a step of:

automatically positioning said at least one of said selected portions of the frames and said at least one identifier on said printable medium.

10. Method according to claim 9, further comprising a step of:

automatically selecting a print size for said one of said selected portions of said plural frames.

11. Method according to claim 1, further comprising a step of:

storing interface data and control data associated with said printable image data.

12. Apparatus for processing an input video data stream comprising:

a buffer for storing at least portions of plural frames of an input video data stream as printable image data; and a processor for processing said at least portions of the plural frames stored in said buffer to correlate said at least portions of the frames to said input video data stream using at least one identifier, wherein said identifier includes an index which correlates at least one of said selected portions of said frames to a sequential location within said incoming video data stream and an image sequence identifier which identifies a reordered print sequence within which said stored portions of said video frames are to be printed, said identifier being stored with said at least one of said selected portions of the frames for retrieving said at least one of said portions of said frames from said memory, said processor controlling printing of said at least one of said selected plural frames in said reordered print sequence in accordance with a print format.

13. Apparatus according to claim 12, further comprising:

a converter for converting said at least one of said selected portions of said video frames from a first video data format to a second video data format; and a data compressor for selectively reducing an amount of stored data used to represent said at least a portion of the frame in said buffer.

14. Apparatus according to claim 12, wherein said processor further includes:

means for selectively trimming said at least one of said selected portions of the frames stored in said buffer;

means for scaling a printable image associated with said printable image data of said at least one of said selected portions of the frames; and means for formatting said printable image data of said at least one of said selected portions of the frames and said identifier for output to a printing device.

15. Apparatus according to claim 14, wherein said processor further includes:

means for correcting color of said printable image.

16. Method according to claim 1, further comprising the steps of:

automatically detecting that said at least one of said selected portions will not fit on an available printable medium; and processing said printable image data to automatically rotate said at least one of said selected portions relative to said printable medium upon automatically detecting that said at least one of said selected portions will not fit on said available printable medium.

17. Apparatus according to claim 12, wherein said processor automatically detects that said at least of said selected portions will not fit on an available printable medium, and processes said printable image data to automatically rotate said at least one of said selected portions relative to said printable medium upon automatically detecting that said at least one of said selected portions will not fit on said available printable medium.

18. Method for processing an input video data stream comprising steps of:

selecting and storing at least a portion of a frame of the input video data stream in a memory as printable image data; and processing said selected at least a portion of the frame to correlate said at least a portion of the frame to said input video data stream using at least one identifier, wherein said identifier includes an index which correlates said selected at least a portion of said frame to a sequential location within said incoming video data stream and an image sequence identifier which identifies a sequence within which said stored portion of said video frame is to be printed, said identifier being stored with said at least a portion of a frame for retrieving said at least portion of a frame from said memory;

automatically detecting that said at least a portion of a frame will not fit on an available printable medium; and processing said printable image data to automatically rotate said at least a portion of a frame relative to said printable medium upon automatically detecting that said at least a portion of a frame will not fit on said available printable medium.

19. Apparatus for processing an input video data stream comprising:

a buffer for storing at least a portion of a frame of an input video data stream as printable image data; and a processor for processing said at least a portion of the frame stored in said buffer to correlate said at least a portion of the frame to said input video data stream using at least one identifier, wherein said identifier includes an index which correlates said selected at least a portion of said frame to a sequential location within said incoming video data stream and an image sequence identifier which identifies a sequence within which said stored portion of said video frame is to be printed, said identifier being stored with said at least a portion of a frame for retrieving said at least a portion of a frame from said memory, wherein said processor automatically detects that said at least a portion of a frame will not fit on an available printable medium, and processes said printable image data to automatically rotate said at least a portion of a frame relative to said printable medium upon automatically detecting that said at least a portion of the frame will not fit on said available printable medium.

* * * * *